Patented Mar. 18, 1969

3,433,708
PROCESS FOR PRODUCING A POLYSACCHARIDE
William H. McNeely, San Diego, Calif., assignor to Kelco Company, San Diego, Calif., a corporation of Delaware
No Drawing. Filed Feb. 1, 1966, Ser. No. 523,851
U.S. Cl. 195—31     15 Claims
Int. Cl. C12d 13/04; C12b 1/02

ABSTRACT OF THE DISCLOSURE

Xanthomonas hydrophilic colloid is produced by growing Xanthomonas bacteria on a media containing a carbohydrate source in the form of a hydrohyzate obtained from the essentially complete hydrolysis of a cereal grain.

---

This invention relates to a novel process for synthesizing certain polysaccharide polymers through the action of a bacteria of the genus Xanthomonas on a crude or partially purified carbohydrate source produced by essentially complete hydrolysis of milled cereal grains. More particularly, the invention relates to a novel process involving the fermentation of a crude or partially purified carbohydrate source produced from essentially complete hydrolysis of milled cereal grains by bacteria of the genus Xanthomonas under controlled conditions, which process increases the growth rate of the bacteria and produces the polysaccharide product through the use of a more economical fermentation cycle.

Xanthomonas hydrophilic colloids have been previously produced by a process developed by chemists at the Northern Regional Research Laboratory of the United States Department of Agriculture at Peoria, Ill. This process, hereinafter called the Peoria process, employs commercial glucose in a final stage fermentation which requires approximately four days. The fermentation cycle is carried out in a well aerated medium containing commercial glucose, dried distillers' solubles, dibasic potassium phosphate, magnesium sulphate and water.

The aeration, organic nitrogen source, glucose, essentially neutral pH, and temperature of about 28° C., all as required by the Peoria process, are ideal conditions for the growth of many microorganisms. In a commercial fermentation process, it is difficult to maintain absolute sterility of the fermentation medium. As a result, there is considerable opportunity for the growth of contaminant bacteria which may grow faster than the bacteria of the genus Xanthomonas. When this occurs, the contaminant bacteria may become the predominant species in the fermentation medium. At worst, this could result in complete loss of the fermentation batch. Further, the desired product may contain viable spores of the contaminant bacteria. The Xanthomonas bacteria itself is a non-spore forming, Gram-negative bacteria and does not survive the conditions employed in isolating the polysaccharide product.

In a shorter final fermentation cycle, the problem of bacterial contamination is considerably lessened. A shorter cycle does not provide as much time for a bacterial contaminant to grow or produce spores and to compete with the Xanthomonas bacteria for the available food supply in the nutrient medium. Moreover, a shorter final fermentation cycle produces great economies in equipment cost, labor and power costs required to produce the polysaccharide product.

An object of my invention is to provide a novel process for producing polysaccharides in a fermentation by the action of bacteria of the genus Xanthomonas on crude or partially purified carbohydrates produced directly from essentially complete hydrolysis of cereal grains.

A further object is to provide an improved process for preparing a Xanthomonas hydrophilic colloid through the fermentation of crude or partially purified carbohydrates produced from milled cereal grains through essentially complete hydrolysis thereof, with a bacteria of the genus Xanthomonas, which process utilizes a shortened final fermentation cycle.

A still further object is to provide an improved process for preparing a Xanthomonas hydrophilic colloid through the fermentation of carbohydrates produced directly from milled cereal grains by essentially complete enzymatic hydrolysis of the starch content therein with a bacteria of the genus Xanthomonas.

Additional objects will become apparent from the description and claims which follow.

In accord with my invention, I have discovered that the fermentation of carbohydrates by a bacteria of the genus Xanthomonas to produce a polysaccharide product is greatly improved when the carbohydrate source employed is the crude or partially purified hydrolysate resulting from essentially complete hydrolysis of the starch content in milled cereal grains. The hydrolysis of the milled cereal grains to produce the carbohydrate source employed in my process can be accomplished by several means, such as by acid hydrolysis or by enzymatic hydrolysis. Preferably, the carbohydrate source employed in my process is obtained by essentially complete enzymatic hydrolysis of the starch contained in milled cereal grains. I have found that the use of such a carbohydrate source in the nutrient medium produces a faster growth rate of Xanthomonas bacteria and consequently an improved production of Xanthomonas hydrophilic colloid than heretofore obtainable by using an equivalent amount of commercial glucose as the carbohydrate source. Moreover, the carbohydrate source employed in my process is cheaper than an equivalent amount of commercial glucose. This further results in decreasing the cost of the Xanthomonas hydrophilic colloid product.

The carbohydrate source employed in my process may be in the form of the crude unfiltered hydrolysate produced by essentially complete hydrolysis of milled cereal grains. However, a partially purified hydrolysate may likewise be employed in my process. The partially purified hydrolysate may be filtered or filtered and then decolorized by passing it through activated charcoal.

In one procedure for producing the carbohydrate source employed in my process, a cereal grain such as barley, corn, sorghum, rice, rye, wheat, or oats is milled to a size which will preferably pass through a 100-mesh screen. The milled material is then slurried with water at a concentration of about 2 to about 45% by weight of the slurry. A preferred concentration of milled cereal grain is about 33% by weight of the slurry. The slurry of milled cereal grain is then treated with a diastatic enzyme which hydrolyzes the starch content of the milled cereal grain to glucose. Diastatic enzymes are well known in the art as enzymes which hydrolyze starch to glucose.

In some cases, I prefer to hydrolyze the starch content of the milled cereal grain to glucose in a two-step process. The first step involves treatment of the starch with a suitable starch liquefying enzyme such as Rhozyme H-39 which is produced by the Rohm and Haas Company. During and/or prior to hydrolysis, the pH of the slurry may be adjusted by the addition of an acid such as hydrochloric acid to give a pH of about 5.5, which is the optimum for this particular enzyme. After adjustment of the pH of the slurry to an appropriate level, the Rhozyme H-39 may be added. The concentration of Rhozyme H-39 is generally about 0.02 to about 0.1% and preferably about 0.06% by weight of the cereal grain solids. Following addition of the enzyme, the slurry is then held at a temperature of about 65 to about 80°

C., and preferably about 76° C. with agitation. These conditions are maintained until the viscosity breaks abruptly. When employing a temperature of about 76° C., it has been found that a period of 15 minutes with agitation gave optimum results.

Following the abrupt break in the viscosity of the slurry, the temperature is then raised to about 95° C. for 10 minutes to insure complete gelatinization of the starch. After completion of the gelatinization step, the temperature is lowered to about 55°, the pH is adjusted to the optimum condition for the action of an amyloglucosidase enzyme. Such an enzyme is then added with stirring of the slurry. An appropriate amyloglucosidase enzyme is diastase 73, produced by the Rohm and Haas Company, which works well at a pH of about 4.5. This enzyme may be added at a concentration of about 0.1 to about 1.5% and preferably about 0.8% by weight based on the weight of cereal grain solids. Following addition of the amyloglucosidase enzyme, the mixture is held at about 55° C. until the hydrolysis of the starches in the milled cereal grain is essentially complete. When utilizing the above procedure, it was found that holding the mixture at 55° for about 72 hours gave the optimum production of glucose from the hydrolysis reaction.

Essential completion of the hydrolysis is determined by analyzing the content of the reducing sugars in the hydrolysate, calculated as dextrose (dextrose equivalent). The content of reducing sugars is determined by the Lane and Eynon copper reduction method, which is a standard analytical technique. Essentially complete hydrolysis results when the dextrose equivalent of the reducing sugar content does not increase appreciably with increased time of reaction.

After determining that the hydrolysis is essentially complete, filter aid may be added and the slurry may be filtered. If desired, the solution may then be decolorized by contacting it with activated carbon or an equivalent decolorizing agent. The resulting solution may then be used directly as a complete replacement, on a dextrose equivalent basis, for the dextrose or glucose source employed in the fermentation process for preparing a Xanthomonas hydrophilic colloid. Filtration and decolorization of the hydrolysate are not essential. If desired, the crude unfiltered hydrolysate can be employed in my process. Prior to incorporation in the fermentation process, the enzymes present in the carbohydrate source are deactivated such as by heating with steam at a pressure of about 15 p.s.i.g.

The above mode of enzymatically hydrolyzing a milled cereal grain to produce a crude or partially purified source of glucose is set forth merely for purposes of illustration and should not be construed as a limitation upon my process. The precise mode of hydrolyzing the milled cereal grain to produce the crude or partially purified carbohydrate source for my process may be varied without departing from the spirit of this invention. Thus, for example, other diastatic enzymes, which are known to the art, may be employed for the hydrolysis of the starch content in milled cereal grain or, conversely, an entirely different mode of hydrolysis, such as acid hydrolysis, may be employed.

In practicing my procss, the Xanthomonas bacteria employed in the final fermentation are grown in several stages prior to their introduction into the final fermentation medium. This procedure is employed in order to obtain a more vigorous growth of the bacteria in the final fermentation medium.

In practicing my process, the Xanthomonas bacteria medium is inoculated with an organism of the genus Xanthomonas and is permitted to incubate at about room temperature under aerobic conditions for a period in the order of 50 hours. The fermentation medium contains a carbohydrate source, as previously defined, which is the crude or partially purified hydrolysate obtained from essentially complete hydrolysis of a milled cereal grain. The carbohydrate source is present at a concentration sufficient to give a dextrose equivalent concentration of about 1 to about 5% by weight. A further ingredient which is present in the fermentation medium is a source of magnesium ions. Magnesium ions are present in the fermentation medium in at least trace amounts, e.g., about 0.0005 to about 0.0015% by weight, and suitable sources of magnesium ions include water soluble magnesium salts such as magnesium acetate, magnesium chloride, magnesium nitrate, and magnesium acid phosphate.

The pH of the fermentation medium is quite important to suitable growth of the Xanthomonas bacteria. I have found that colloid production by the Xanthomonas bacteria becomes inefficient below a pH of about 6.1. My preferred pH range is from about 6.5 to about 7.5. Control of the pH within this range can be obtained by the use of a buffer compound such as dipotassium acid phosphate at a concentration from about 0.4 to about 0.5% by weight of the fermentation medium. Conversely, the pH of the fermentation medium can be controlled through conventional means employing a pH meter coupled with a source of suitable base, such as a solution of potassium hydroxide. As the pH is lowered due to the production of acids in the fermentation reaction, small quantities of the potassium hydroxide solution may be automatically added by the pH control system to keep the pH within the desired range.

At least a trace quantity of phosphorus, generally in the form of a soluble phosphate salt, is also present in the fermentation medium. Larger quantities of phosphorus such as about 0.6% by weight of the fermentation medium (calculated as dipotassium acid phosphate) can, however, also be employed.

In order to obtain a rapid fermentation, I have found that it is essential to have the correct amount of oxygen available for the growing bacterial culture. If either too little or too much oxygen is available, the production of Xanthomonas hydrophilic colloid by the culture is slowed down. My process requires that the oxygen made available produce a sulfite oxidation value within the range of about 1.5 to about 3.5 millimoles of oxygen per liter per minute. Preferred sulfite oxidation values are from 2.0 to 3.0 millimoles of oxygen per liter per minute. A description of sulfite oxidation value is set forth in an article in Industrial Engineering Chemistry, volume 36, page 504 (1936) by C. M. Cooper, G. A. Fernstrom and S. A. Miller. The sulfite oxidation value is a measure of the rate of oxygen uptake in the fermentor under the agitation and aeration conditions employed.

A further ingredient which is present in the fermentation medium is a source of ntirogen. The nitrogen source may be organic in nature, as, for example, an enzymatic digest of soybean meal such as Soy Peptone Type T or Promosoy 100, a pancreatic hydrolysate of casein such as N–Z Amine Type AT, an enzymatic digest of proteins such as Ferm-Amine Type IV, or distillers' solubles such as Stimuflav. Promosoy 100 is sold by Central Soya Chemurgy Division; Stimuflav is marketed by Hiram Walker & Sons, Inc., and the other materials are sold by Sheffield Chemical, Norwich, N.Y. When utilizing only an organic nitrogen source in the fermentation medium, it is present in an amount ranging between about 0.1 and about 0.6% by weight of the fermentation medium. A preferred range is about 0.3 to about 0.4% by weight.

As shown in my co-pending United States patent application entitled "Process for Producing a Polysaccharide," ammonium nitrate may be employed as an inorganic nitrogen source in the fermentation medium. The subject matter of my co-pending application is incorporated herein by reference. The amount of ammonium nitrate employed ranges from about 0.02 to about 0.15 and preferably from about 0.045 to about 0.09% by weight of the fermentation medium.

The growth of the Xanthomonas bacteria in the seed fermentor (the growth stage preceding transfer of the bacteria to the final fermentation medium) must be carefully controlled in order to obtain vigorous growth of the bacteria after they are transferred to the final fermentation medium. The conditions employed in the seed fermentor and the final fermentor differ in some respects.

One difference between the conditions in the seed fermentor and in the final fermentor concerns the content of an organic nitrogen source which I may employ. The various organic nitrogen sources are as defined previously. In the seed fermentor, I generally employ an organic nitrogen source in an amount ranging from about 0.1 to about 0.5% by weight in conjunction with ammonium nitrate in the amounts specified previously. However, in the final fermentation medium, I employ either none or a lesser amount of the organic nitrogen source in an amount up to about 0.1% by weight of the medium in conjunction with ammonium nitrate in the amounts specified previously.

As shown in my co-pending United States patent application entitled "Process for Producing a Polysaccharide," the lag phase of the bacterial life cycle in the final fermentation stage is considerably reduced if the inoculant medium containing Xanthomonas seed bacteria for the final fermentation stage is removed from the seed fermentor immediately preceding the final fermentation stage when the bacterial culture is well into the stationary phase of its life cycle. The seed bacteria are preferably about 25 to about 75% of the way through the stationary phase of the culture life cycle and, and more preferably, about 50 to about 60% of the way through the stationary phase of the culture life cycle when an inoculum of the seed bacteria in the seed fermentation medium is removed and transferred to the final fermentation medium. This procedure may be employed in the process of the present invention and the subject matter of my co-pending application is incorporated by reference herein.

The seed fermentation medium includes a suitable carbohydrate such as dextrose, sucrose, maltose, fructose, lactose and corn starch at a concentration of about 1 to about 5% by weight. The carbohydrate source employed in the seed fermentation medium can also be the same as that employed in the final fermentation medium, i.e., a crude or partially purified hydrolysate obtained from essentially complete hydrolysis of milled cereal grains in the amounts specified previously.

As set forth in another of my co-pending United States patent applications, entitled "Process for Producing a Polysaccharide," which is incorporated by reference herein, the seed fermentation medium can also contain a flour or bran as a partial or complete replacement for the carbohydrate.

In other aspects, i.e., aeration rates, magnesium ion concentration, phosphorous concentration, etc., the process conditions employed in the final fermentor are the same as those employed in the seed fermentor.

To further illustrate my invention, there are presented the following examples in which all parts and percentages are by weight unless otherwise indicated:

Example I

A 33% aqueous slurry of milled whole grain, after adjustment to a pH of 5.5 with hydrochloric acid, was stirred for 15 minutes at 76° C. with 0.06% (on the grain solids basis) of Rhozyme H–39, an amylase enzyme sold by Rohm and Haas Company. The slurry was then heated at 95° C. for 10 minutes to complete the gelatinization of the starch. The slurry was cooled to 55° C., the pH was adjusted to 4.5 with hydrochloric acid and 0.8% (on the grain solids basis) of Diastase 73, an amyloglucosidase enzyme produced by Rohm and Haas Company, was added. This slurry was then held at 55° C. for 72 hours. The reducing sugars were determined in the slurry by the Lane and Eynon copper reduction method.

After adding 50 grams of diatomaceous earth filter aid per liter of hydrolysate, the slurry was filtered. The filter cake was washed to recover essentially all the soluble sugars from the filter cake. The combined filtrates were used to supply all of the carbohydrate (3%) calculated on a dextrose equivalent basis in the final fermentation in a 10-gallon fermentor as described in Example II. In several runs, the content of reducing sugars calculated as dextrose (dextrose equivalent) was 72% by weight for hydrolyzed barley flour, 75% by weight for hydrolyzed rice flour and 61% by weight for hydrolyzed corn flour with the percentages being based on the starting weights of milled cereal grain.

Example II

A fermentation medium was prepared in a 100-gallon seed fermentor by adding the following ingredients to the fermentor:

|  | Percent | Weight |
|---|---|---|
| Rice flour | 3.00 | 15 lbs. |
| Dipotassium acid phosphate | 0.50 | 1,135 gms. |
| Ammonium nitrate | 0.09 | 204 gms. |
| Soy Peptone Type T (supplied by Sheffield Chemical Co.) | 0.05 | 113 gms. |
| Magnesium sulphate heptahydrate | 0.01 | 23.7 gms. |
| Water | | 482 lbs. |

The sterile seed medium was inoculated aseptically with 500 ml. of *Xanthomonas campestris* inoculum. The inoculum had previously been prepared by inoculating 490 ml. of sterile YM broth (Diffco) in a 2-liter flask with 10 ml. of *Xanthomonas campestris* bacterial culture taken from a seed culture prepared by aerobic fermentation in a Diffco broth for 24 hours in a shake flask. The 500 ml. of seed culture in the 2-liter flask had been grown for 40 hours in a shaking machine in a room maintained at 29° C. YM broth is sold by the Diffco Chemical Company and contains the following ingredients in the following proportions:

|  | Gms. |
|---|---|
| Bacto yeast extract | 3 |
| Malt extract, Diffco | 3 |
| Bacto-Peptone | 5 |
| Bacto-Dextrose | 10 |

The above quantities of ingredients are used to form a broth by adding water in an amount to form 1 liter of material. Such a broth was employed in incubating the *Xanthomonas campestris* bacterium employed as an inoculant.

The temperature of the seed fermentor, inoculated with *Xanthomonas campestris* bacteria in the manner described above, was maintained at 29° C. with vigorous agitation and aeration at a rate of 0.5 cubic feet of air per cubic foot of medium volume (measured at standard temperature and pressure). At the end of 33 hours the viscosity of the fermentation beer in the seed fermentor was 1000 cps. At this point 1135 ml. of inoculum was taken aseptically from the seed fermentor and used to inoculate 6 gallons of sterile media in 10-gallon final fermentors.

The 6 gallons of sterile fermentation media in the final 10-gallon fermentation stages contained the following:

MEDIA FOR 10-GALLON FERMENTORS

|  | Grams | Percent by weight |
|---|---|---|
| Hydrolyzed grain flour in terms of dextrose equivalent (calculated as glucose, anhydrous basis) | 681 | 3.0 |
| Dipotassium acid phosphate | 113.5 | 0.5 |
| Ammonium nitrate | 20.4 | 0.09 |
| Soy Peptone Type T (Sheffield Chemical Co.) | 11.35 | 0.05 |
| Magnesium sulfate.7 H₂O | 2.27 | 0.01 |
| Water (to 6 gallons) | | |

The temperatures of the 10-gallon fermentors were maintained at 29° C. while the inoculated media were agitated vigorously and aerated at a rate of 0.5 cubic feet of air per cubic foot of media per minute (measured at standard temperature and pressure). Samples of the fermentation beer were taken at intervals and the viscosity determined at 20° C. using a Brookfield Model LVF Viscometer having a spindle rotating at 60 r.p.m.

Xanthomonas hydrophilic colloid production tests were run according to the above procedure on the hydrolysates produced in Example I from milled barley, milled corn and milled rice. In each case essentially completely hydrolyzed cereal grain solution was employed as the sole carbohydrate source in the final fermentation medium to give 3.0% by weight of the medium calculated as dextrose equivalent. A control fermentation was run using 3.0% by weight of the media of commercial dextrose (calculated as anhydrous glucose). The results of these tests are set forth in the following table:

TABLE I

| | Viscosity at 20 hrs. (cps.) | Viscosity at 42 hrs. (cps.) | Viscosity at 46 hrs. (cps.) | Viscosity at 50 hrs. (cps.) |
|---|---|---|---|---|
| Control media with 3% glucose (commercial dextrose) only | 18 | 1,800 | 3,550 | [1] 4,400 |
| Hydrolyzed barley flour | 770 | 3,460 | [1] 4,400 | 4,500 |
| Hydrolyzed rice flour | 550 | 3,610 | [1] 4,610 | 4,630 |
| Hydrolyzed corn flour | 52 | 2,900 | [1] 3,700 | 3,750 |

[1] Complete.

Xanthomonas hydrophilic colloid was isolated at the completion of the fermentations by precipitating the colloid content of the fermentation beer with 2 parts of isopropyl alcohol. The isolated colloid was dried and milled. On reconstituting the colloid samples in water to give 1% solutions, all products were found to give viscosities in the same range as the colloid produced using the glucose control.

As shown in Table I, the less expensive enzymatically hydrolyzed cereal grains were, on a dextrose equivalent basis, not only equal to the more expensive commercial dextrose but actually gave superior results. In each case the hydrolysate of the cereal grain produced Xanthomonas hydrophilic colloid, as shown by the fermentation beer viscosities, at a considerably faster rate than the commercial dextrose control. Also, in each case the fermentation was completed sooner with the enzymatically produced cereal grain hydrolysate than with the commercial dextrose. Completion of the fermentation reaction was determined by analyzing the fermentation medium for reducing sugars. Completion of the fermentation was defined as the point where the reducing sugars calculated as dextrose dropped below 0.1% by weight of the medium when the viscosity failed to increase appreciably with time.

The Xanthomonas hydrophilic colloid obtained according to my process can be readily separated from the fermentation beer through precipitation with an alcohol, as illustrated above. Conversely, the Xanthomonas hydrophilic colloid can be obtained from the beer by passing the entire beer through a drum dryer. Any equivalent mode of separation can also be employed such as, for example, spray drying, vacuum drying, freeze drying, and the like.

Although I have illustrated my invention primarily with regard to the employment of the *Xanthomonas campestris* species of bacteria, other bacterial species of the genus Xanthomonas may also be employed in my process. Illustrative species include *Xanthomonas phaseoli, Xanthomonas malvacearum, Xanthomonas carotae, Xanthomonas begoniae, Xanthomonas incanae,* and *Xanthomonas vesicatoria.* Of the various species of Xanthomonas bacteria, I prefer the *Xanthomonas compestris* and *Xanthomonas malvacearum* since these species work particularly well in my process.

The Xanthomonas hydrophilic colloids produced by my process are, as stated previously, colloidal materials produced by bacteria of the genus Xanthomonas. Illustrative of such colloidal materials is the hydrophilic colloid produced by *Xanthomonas campestris* bacterium. This colloid is a high molecular weight, exocellular material in which the polymer contains mannose, glucose, potassium glucronate and acetyl radicals. The potassium portion of the colloid can be replaced by several other cations without substantial change in the properties of the material.

The Xanthomonas hydrophilic colloids produced according to my process may be employed as additives in drilling muds to reduce fluid loss and to suspend the solid materials contained in the mud. Moreover, the colloids may be employed as thickening agents in producing thickened water to be used in the secondary recovery of oil through water flooding.

As illustrated by the foregoing discussion, my invention is a broad one. It permits the replacement of dextrose by less expensive milled cereal grain hydrolysates while at the same time decreasing the time required in the final fermentation stage in the production of a Xanthomonas hydrophilic colloid. In illustrating my invention, I have made reference to specific times, temperatures, compositions, etc. However, I intend that my invention be limited only by the lawful scope of the appended claims and not by the foregoing description.

I claim:

1. A fermentation process, said process comprising inoculating a fermentation medium with an inoculum medium containing a bacterial organism of the genus Xanthomonas, said fermentation medium containing a carbohydrate source in the form of a hydrolysate obtained from the essentially complete hydrolysis of a cereal grain, the concentration of said carbohydrate source ranging from a dextrose equivalent of about 1 to about 5% by weight of said medium, magnesium ions and phosphorus in at least trace amounts, a nitrogen source in minor amount, and water, aerating said fermentation medium under conditions sufficient to produce a sulfite oxidation value ranging from about 1.5 to about 3.5 millimoles of oxygen per liter per minute, and maintaining the pH of the fermentation medium within the range from about 6.5 to about 7.5.

2. The process of claim 1 wherein said nitrogen source contains ammonium nitrate at a concentration ranging from about 0.02 to about 0.15% by weight of said fermentation medium.

3. The process of claim 1 wherein said bacterial organism is a *Xanthomonas campestris* bacteria.

4. The process of claim 1 wherein said carbohydrate source is in the form of a hydrolysate obtained from the essentially complete enzymatic hydrolysis of a milled cereal grain.

5. The process of claim 4 wherein the carbohydrate source is a crude unfiltered hydrolysate obtained from the essentially complete enzymatic hydrolysis of a milled cereal grain.

6. The process of claim 4 wherein the carbohydrate source is a filtered hydrolysate obtained from the essentially complete enzymatic hydrolysis of a milled cereal grain.

7. The process of claim 4 wherein the carbohydrate source is a filtered and decolorized hydrolysate obtained from the essentially complete enzymatic hydrolysis of a milled cereal grain.

8. A fermentation process for producing a Xanthomonas hydrophilic colloid, said process comprising incubating a final fermentation medium including an inoculum of a bacterial organism of the genus Xanthomonas, said fermentation medium containing a carbohydrate source in the form of a hydrolysate obtained from the essentially complete hydrolysis of a cereal grain, the concentration of said carbohydrate source ranging from a dextrose equivalent of about 1 to about 5% by weight of said medium, magnesium ions and phosphorus in at least trace amounts, a nitrogen source in minor amount, and water, aerating said fermentation medium under conditions sufficient to produce a sulfite oxidation value ranging from about 1.5 to about 3.5 millimoles of oxygen per liter per minute, maintaining the pH of the fermentation medium within the range from about 6.5 to about 7.5 and recovering the hydrophilic colloid produced by said Xanthomonas bacteria.

9. The process of claim 8 wherein said nitrogen source contains ammonium nitrate at a concentration ranging from about 0.02 to about 0.15% by weight of said fermentation medium.

10. The process of claim 9 wherein said nitrogen source includes ammonium nitrate at a concentration ranging from about 0.045 to about 0.09% by weight of said fermentation medium, and an organic nitrogen source in an amount up to about 0.1% by weight of said fermentation medium.

11. The process of claim 8 wherein said bacterial organism is a *Xanthomonas campestris* bacteria.

12. The process of claim 8 wherein said carbohydrate source is in the form of a hydrolysate obtained from the essentially complete enzymatic hydrolysis of a milled cereal grain.

13. The process of claim 12 wherein the carbohydrate source is a crude unfiltered hydrolysate obtained from the essentially complete enzymatic hydrolysis of a milled cereal grain.

14. The process of claim 12 wherein the carbohydrate source is a filtered hydrolysate obtained from the essentially complete enzymatic hydrolysis of a milled cereal grain.

15. The process of claim 12 wherein the carbohydrate source is a filtered and decolorized hydrolysate obtained from the essentially complete enzymatic hydrolysis of a milled cereal grain.

References Cited

UNITED STATES PATENTS

| 2,567,000 | 9/1951 | Wallerstein et al. | 195—11 |
| 3,096,293 | 7/1963 | Jeanes et al. | |
| 3,271,267 | 9/1966 | Weber et al. | |

ALVIN E. TANENHOLTZ, *Primary Examiner.*

U.S. Cl. X.R.

195—100, 109